(12) United States Patent
Srinivasan et al.

(10) Patent No.: US 7,286,748 B2
(45) Date of Patent: Oct. 23, 2007

(54) SHARING LIVE ADVANCED STREAMING FORMAT INDEXED FILES

(75) Inventors: Jai Srinivasan, Kirkland, WA (US); Matthijs A. Gates, Seattle, WA (US); Philippe Ferriere, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1250 days.

(21) Appl. No.: 10/206,253

(22) Filed: Jul. 25, 2002

(65) Prior Publication Data

US 2004/0028042 A1    Feb. 12, 2004

(51) Int. Cl.
*H04N 5/91*    (2006.01)
(52) U.S. Cl. ............................. 386/69; 386/45; 386/95; 386/96; 386/125; 386/126; 369/68
(58) Field of Classification Search .................. 386/45, 386/46, 125, 126, 83, 95, 96, 69, 106; 369/68
See application file for complete search history.

(56) References Cited

U.S. PATENT DOCUMENTS 5,988,818 A * 11/1999 Fujimori et al. ............ 353/119
6,714,720 B1 * 3/2004 Lightstone et al. ........... 386/46
6,742,176 B1 * 5/2004 Million et al. ............... 717/120
7,051,047 B2 * 5/2006 Jung et al. ................ 707/104.1

OTHER PUBLICATIONS

Terrence Disz, et al., "The Argonne Voyager Multimedia Server", Argonne National Laboratory, Copyright 1997, pp. 71-80.

\* cited by examiner

*Primary Examiner*—John Miller
*Assistant Examiner*—Jamie J Vent
(74) *Attorney, Agent, or Firm*—Workman Nydegger

(57) ABSTRACT

A computing system connected to storage medium and one or more rendering devices receives streamed multimedia data. The multimedia data is encoded in a format, such as an Advanced Streaming Format, that is conducive to storing the multimedia data in files having appended indexes. Upon receiving the multimedia data, the multimedia data is written to file structures within the storage medium, while at the same time maintaining a real-time index for each file in a shared memory. After a file is complete, the real-time index is appended to the completed file and deleted from the shared memory. When a request for data is received that pertains to a file that does not have an appended index, the computing system obtains any necessary file index information from the real-time index in the shared memory, thereby enabling the requested data to be accessed.

43 Claims, 5 Drawing Sheets

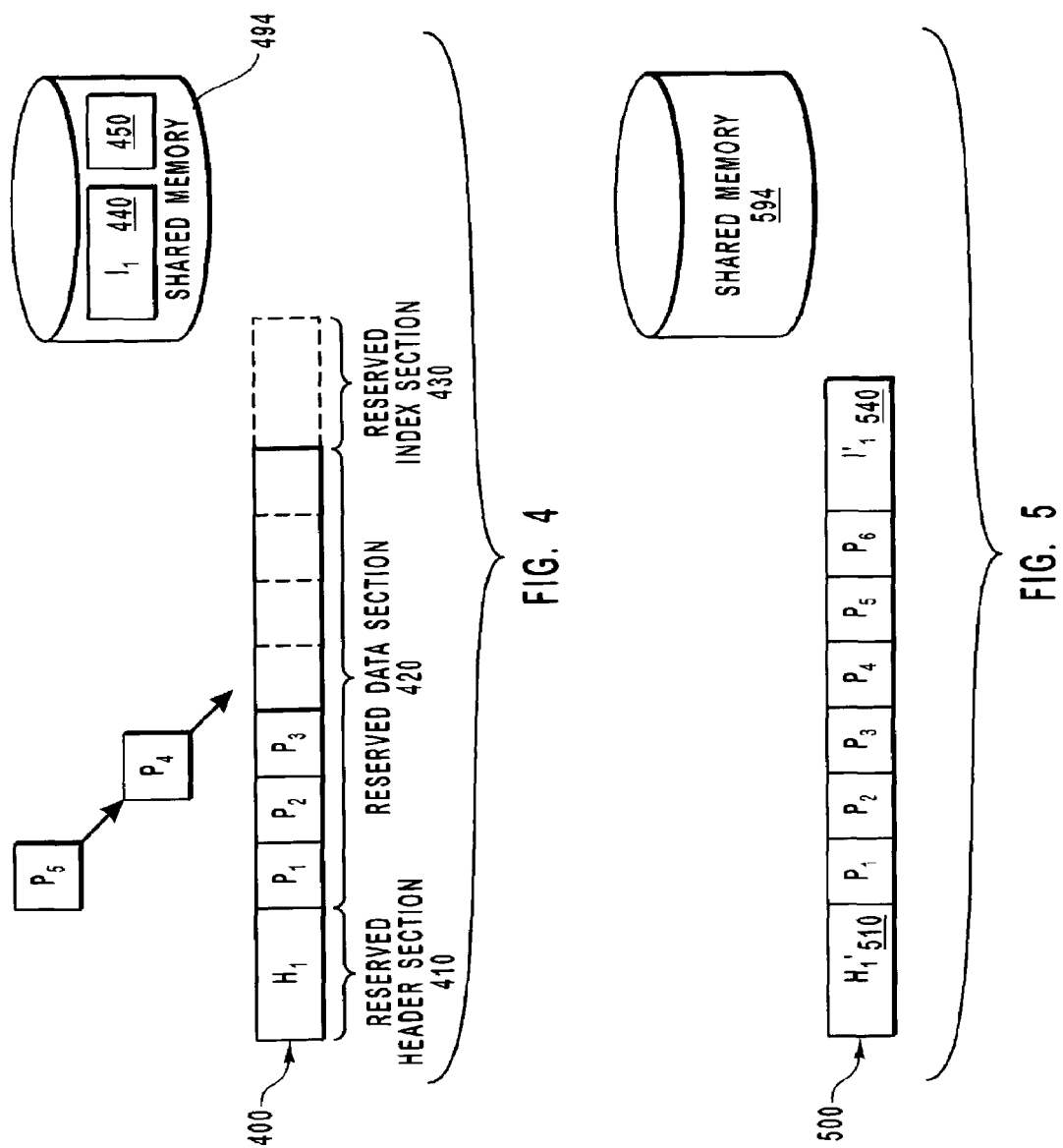

SHARING LIVE ADVANCED STREAMING FORMAT INDEXED FILES

BACKGROUND OF THE INVENTION

1. The Field of the Invention

The present invention is directed to writing multimedia data to a storage medium and, more particularly, to the buffering of streamed multimedia data in a manner that enables the streamed multimedia data to be accessed from a file even while the file is being written to.

2. Related Technology

The advent of broadcasting data in a digital format has allowed for many conveniences not previously considered practical for the VCR. For instance, digital data can be recorded and indexed on a hard disk or another mass storage device, thereby enabling the recorded data to be accessed promptly, without requiring the data to be fast-forwarded and rewound in the sequential and time-consuming manner that is required when storing the data on traditional videocassettes. Another general benefit provided by digital data is that writing and reading digital data to a storage medium can occur simultaneously, such that the viewer can access previously recorded data without interrupting the recording of new data.

One drawback of digital data, however, is that it is file-based, such that data within a designated file typically cannot be accessed and utilized until the entire contents of the file have been received. Recently, however, certain standards have been developed which enable file-based data to be encoded in a streaming format, so that the data can be accessed and read at the same time it is being received, and without first requiring the entire contents of the streamed data file to be received. Examples of the various standards and formats for streaming data include MPEG (Moving Picture Experts Group), ASF (Advanced Streaming Format), AVI (Audio Video Interleave), Active Movie and QuickTime.

Employing such a streaming format allows the streamed data to be accessed and viewed prior to receiving the entire contents of the stream. Devices such as Programmable Video Recorders (PVRs) further allow a viewer to alter the manner in which the streamed data is viewed. PVRs enable these features using ring buffers. Ring buffers, which are well known to those of ordinary skill in the art, comprise temporary storage of a predetermined size in which the oldest stored data is overwritten with the most recently received data. The ring buffer enables the PVR to store data as it is received even though the PVR is playing other data at the same time. A PVR having a ring buffer also enables a viewer to temporarily pause the play of a program, while the program is continuously recorded to the ring buffer, wherein upon resuming the play of the program, the viewer can watch the content that was recorded into the ring buffer during the temporary pause of the play.

Other VCR-like features that PVRs offer viewers are replaying a program segment, fast forwarding or rewinding through a program and viewing the stream from previously bookmarked locations (such as the start of a show). All these features require interrupting the viewing of the program stream, seeking to another point in the stream and resuming the viewing from that point. For example, to replay a program segment, the PVR must stop displaying the current program, jump back a certain duration, say 5 seconds, in the program stream and start displaying the program stream from that point on. In order to do this efficiently, the ring buffer must be indexed. An index associates time instants with the data in the program stream that is normally displayed at that time instant.

One limitation of streamed data, however, is that only certain formats of streamed data can be stored in a ring buffer. In particular, it is not practical to write streamed data having appended indexes and discrete headers, such as ASF data, into a ring buffer. Overwriting a portion of an ASF data file may corrupt or make inaccessible the entire contents of the data file, even though only a portion of the file is overwritten. Accordingly, it is not practical to overwrite ASF data in a traditional ring buffer. One solution to overcome this limitation, may include a buffer that is comprised of several files, as disclosed in U.S. patent application Ser. No. 10/175,208, filed on Jun. 19, 2002, entitled "Programmable Video Recorder Backing Store For Non-Byte Stream Formats," which is incorporated herein by reference. According to the incorporated patent disclosure, one of the several files included within a buffer may be discarded when the buffer is full so that data can be written to a new file that is added to the buffer, instead of overwriting data within a single file of a ring buffer and thereby making all of the data within the ring buffer inaccessible.

Another limitation of certain streamed data, specifically streamed data such as ASF data that must be recorded with appended indexes, is that the recorded data can only be accessed after the file is complete (e.g., writing to the file has stopped) and the index has been appended to the file. The index is not appended to a 'live' file (e.g., a file that is being written to) because the data section of the file is continuously growing. If the index were appended to the end of a live file then the index would have to be shifted and rewritten several times to accommodate the growth of the data section, which is an expensive operation.

Accordingly, the functionality of a PVR, which stores ASF data or similarly formatted streamed data in the ring buffer, is correspondingly limited to the predetermined size of the files that are used to buffer the data in the PVR. For instance, if the size of the ASF files which are used to buffer the incoming data have the capacity to store five minutes of content, then the PVR will not be able to seek and replay the most recently received content that is contained in the 'live' file (up to five minutes worth of content). Only after the file is complete and the index of the file is appended to the file can the recorded content be accessed from the file.

Accordingly, as the capacity of the files that are used to buffer the ASF data increases, the duration of content that may be inaccessible to the viewer at any given time also increases. However, the problems associated with buffering ASF data cannot simply be remedied by decreasing the holding capacity of the storage files. In particular, as the capacity of the files decreases, the frequency in which file indexes must be created and appended to the files conversely increases, thereby decreasing the overall efficiency of buffering the data.

Accordingly, there currently exists a need in the art for improved methods and systems for buffering streamed data, such as ASF data, that is stored in file formats that include appended indexes.

BRIEF SUMMARY OF THE INVENTION

The present invention is directed to improved methods, systems and computer program products for buffering streamed data in a storage medium, and in a manner that enables the multimedia data to be accessed from a file format that includes appended indexes and while the file is being written to.

According to one aspect of the invention, a computing system such as a Programmable Video Recorder (PVR) is in communication with a data source and at least one rendering device. The data source is configured to transmit multimedia data to the computing system through an appropriate communication link and the at least one rendering device is configured to play the multimedia data upon receipt thereof. During use, the computing system receives streamed multimedia data from the data source, stores the data temporarily in one or files comprising a ring buffer, and, according to user instructions, transmits the data to the rendering device(s) where the multimedia data is played. According to one embodiment, the multimedia data is encoded in an MPEG format and is converted to an Advanced Streaming Format (ASF) before being stored in the ring buffer, although the invention also extends to other data formats that include appended indexes.

In one embodiment, the computing system of the invention includes a writer and a reader that interact with a Software Development Kit (SDK) in a manner for enabling the computing system to write and read the multimedia data. When ASF multimedia data is received from the data source, the SDK uses a file sink module that is associated with the writer to create a file in a storage medium of the computing system. The file that is created includes a header and a data section but does not include an index. Moreover, some information in the header of the file, such as the size of the file and the number of data samples written to the data section are not updated while the file is growing. The file sink creates and updates a real-time header and a real-time index of the file in shared memory.

Data packets of the multimedia data are written to a file in the storage medium as the multimedia data is received. The corresponding real-time index is updated in the shared memory as the file is being written to. Once the file is closed, the real-time index is appended to the end of the file and deleted from the shared memory. At this time, the header section of the file is also updated with the real-time header in shared memory and the real-time header is deleted from shared memory.

As read requests are received for multimedia data and other information that is contained within a 'live' file (i.e., a file that is being written to and that does not have an appended index), the software development kit uses a file source module to redirect the read requests to access the requested information. Requests for index information and header information are redirected to the real-time index and the real-time header from the shared memory. Requests for data written to the data section of the file are directed to the file. Requests for data that has not yet been written are pended until the data is written.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 4 illustrates one example of a file that is created by the file sink module of the computing system that includes a reserved header section, a reserved data section and a reserved index section;

FIG. 5 illustrates the file of FIG. 4 after the real-time index has been appended to the file; and FIG. 6 is a flow diagram illustrating an example of one method for accessing multimedia data from a live file that is being written to.

DETAILED DESCRIPTION OF THE PREFERRED EMBODIMENTS

Figure 1:
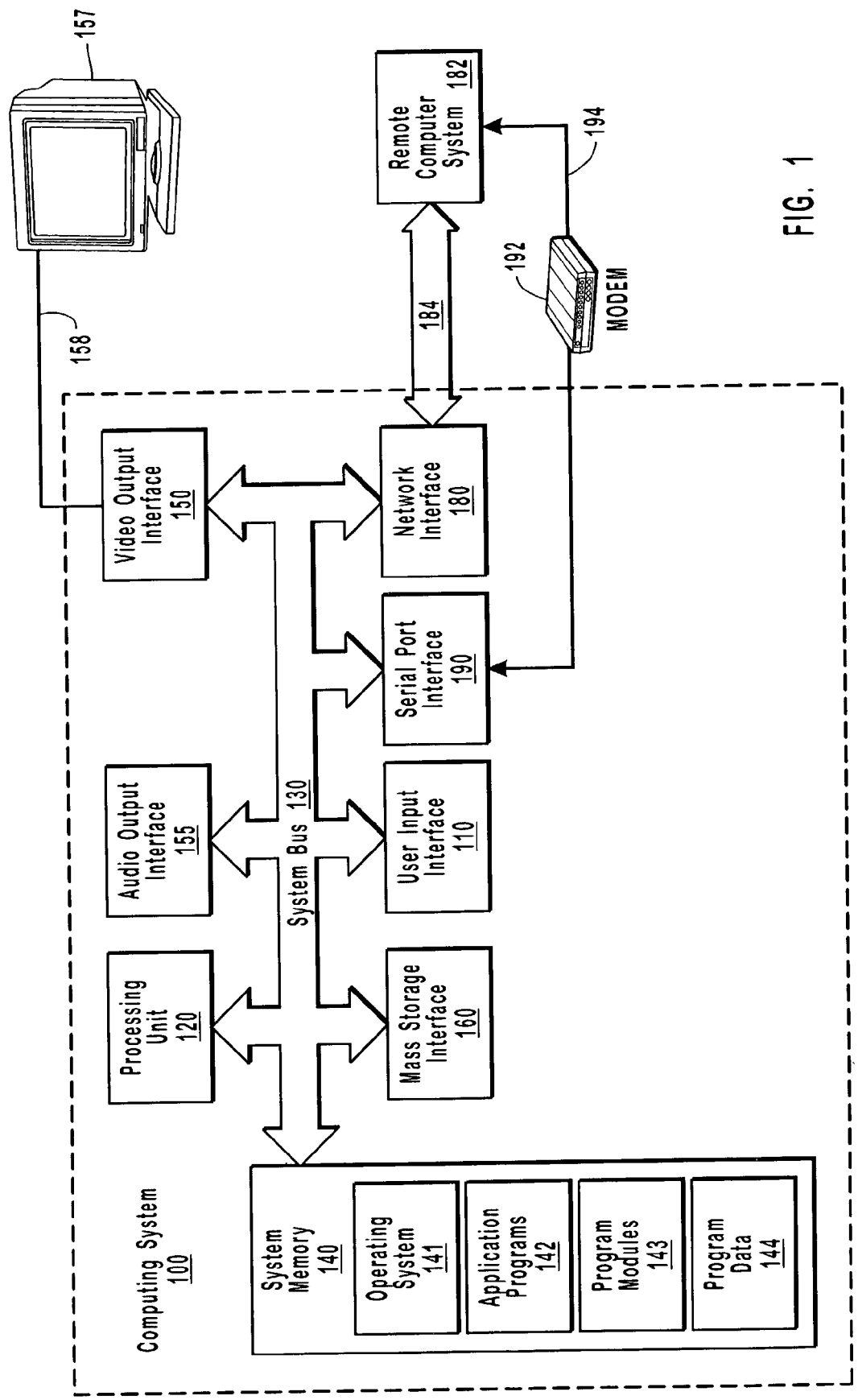
FIG. 1 illustrates an example of a computing system that provides one suitable operating environment for practicing the present invention.

The present invention extends to methods, systems and computer program products for storing streamed multimedia data in a manner that enables the multimedia data to be accessed from a file requiring an appended index, and while the file being written to.

According to one aspect of the invention, a computing system such as a Programmable Video Recorder (PVR) receives multimedia data in a streaming format, such as, but not limited to an MPEG format. The multimedia data is then processed and, for purposes of storage in the ring buffer, converted to some other streaming format, such as, but not limited to the Advanced Streaming Format (ASF), which is typically stored in a file having an appended index.

In one embodiment, the computing system creates a file structure to store the multimedia data that includes a header and a data section but that does not include an index. A real-time index and a real-time header corresponding to the file structure is created separately in a shared memory that can be accessed by one or more reader applications through a Software Development Kit (SDK) and a corresponding file source module. Typically, reader applications read the program stream sequentially. However, in order to provide certain features, such as replaying the program segment that has just been viewed or fast forwarding through the program, a reader application may have to jump to another part of the program stream and then resume reading the program stream sequentially from that point on. When one or more of the reader applications request to seek to data in the multimedia data from a 'live' file (i.e., a file that is being written to), the file source module accesses the real-time index and determines where the requested data is located within the live file so that it can be accessed.

The embodiments of the present invention may comprise a general-purpose or special-purpose computing system including various computer hardware components, which are discussed in greater detail below. Embodiments within the scope of the present invention also include computer-readable media for carrying or having computer-executable instructions, computer-readable instructions, or data structures stored thereon. Such computer-readable media may be any available media, which is accessible by a general-purpose or special-purpose computing system. By way of example, and not limitation, such computer-readable media can comprise physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computing system.

The term "network," as defined herein, includes any architecture where two or more computing systems may exchange data with each other. When information is transferred or provided over a network or another communications connection (either hardwired, wireless, or a combination of hardwired or wireless) to a computing system or computer device, the connection is properly viewed as a computer-readable medium. Thus, any such connection is properly termed a computer-readable medium. Combinations of the above should also be included within the scope of computer-readable media. Computer-executable instructions comprise, for example, instructions and data which cause a general-purpose computing system or special-purpose computing system to perform a certain function or group of functions.

The term "computing system," as described herein, is defined as one or more software modules, one or more hardware modules, and any combinations thereof that work together to perform operations on electronic data. For example, the definition of computing system may include hardware components, as well as software modules for executing computer-executable instructions. The computing system may include one or more computers coupled via a computer network. Likewise, the computing system may include a single physical device (such as a Programmable Video Recorder "PVR") where internal modules (such as a memory and processor) work together to perform operations on electronic data.

Those of ordinary skill in the art will appreciate that the invention described herein may be practiced in network computing environments with many types of computing system configurations, including personal computers, laptop computer, hand-held devices, multi-processor systems, microprocessor-based or programmable consumer electronics, network PCs, minicomputers, mainframe computers, mobile telephones, PDAs, and the like. The invention may also be practiced in distributed computing environments where local and remote computing systems, which are linked (either by hardwired links, wireless links, or by a combination of hardwired or wireless links) through a communication network, both perform tasks. In a distributed computing environment, program modules may be located in both local and remote memory storage devices.

With reference to FIG. 1, an example of a computing system 100 that may be used to implement the principles of the invention is illustrated. According to one embodiment, the computing system 100 may be a PVR that has been adapted to perform the operations that are disclosed herein.

FIG. 1 and the following discussion are intended to provide a brief, general description of one example of a suitable computing environment in which the invention may be implemented. Although not required, the invention will be described in the general context of computer-executable instructions, such as program modules, being executed by computing systems. Generally, program modules include routines, programs, objects, components, data structures, and the like, which perform particular tasks or implement particular abstract data types.

As shown, computing system 100 may include user input interface 110, which may receive information from an input device such as, for example, a keyboard, mouse, microphone, or remote control. An input device may be coupled to user input interface 110 so as to enable the entry of information. An input device may transfer information over such a coupling in response to preprogrammed data or user manipulation of the input device.

Computing system 100 includes processing unit 120, which may allow for complex and flexible general-purpose processing capabilities. Processing unit 120 may execute computer-executable instructions designed to implement features of computing system 100, including features of the present invention. Processing unit 120 is coupled via system bus 130, which also interconnects various other system components, such as system memory 140. System memory 140 generally represents a wide variety of volatile and/or non-volatile memories and may include types of memory previously discussed. However, the particular type of memory used in computing system 100 is not important to the present invention. Program code means comprising one or more program modules may be stored in system memory 140. The one or more program modules may include an operating system 141, one or more application programs 142, other program modules 143, and program data 144.

Computing system 100 may also include video output interface 150, which may provide a video output signal to external video display devices, such as monitor 157. Computing system 100 may be integrally positioned with or separate from a video display device such as monitor 157. Monitor 157 may be configured to display items of different sizes and to display items in different colors. Monitor 157 may be further configured to appropriately update displayed items that change in size and/or color dynamically. Monitor 157 may be coupled to video output interface 150 via video link 158 so as to receive a provided video output signal. Examples of other suitable display devices include, but are not limited to, PDA displays, displays of other portable devices, televisions, computer monitors, and so forth.

Similarly, computing system 100 may also include audio output interface 155, which may provide an audio output signal to external audio output devices. Computing system 100 may be integrally positioned with or separate from an audio system, which may include a speaker or other device capable of emitting sound data. An audio system may be coupled to audio output interface 155 so as to receive a provided audio output signal. Non-limiting examples of suitable audio output devices include stereo systems, amplifiers, radios, television audio systems, and so forth.

Computing system 100 may also include mass storage interface 160, which is configured to read data from and to write data to a mass storage device, such as, for example, a magnetic disk storage device (e.g., a Digital Video Disk (DVD), a Compact Disk (CD)), an optical disk storage device, and a computer hard disk drive. A mass storage device may be coupled to mass storage interface 160 so as to enable the reading and writing of data. When a mass storage device is coupled to mass storage interface 160, one or more program modules including operating system 141, application programs 142, other program modules 143, and program data 144 may be stored in the mass storage device.

Computing system 100 may include network interface 180, through which computing system 100 may receive data from or transmit data to external sources, such as for example, a remote computing system 182 or database. The computing system 100 and the remote computer system 182 may be network connectable to Local Area Networks (LANs) and Wide Area Networks (WANs), such as the Internet, that include external computing systems and databases. The computing system 100 may be connected with the remote computer system 182 through any suitable network communication link 184, as described below. The remote computer system 182 may also be connected to the computer system 100 through a serial port interface 190 and an appropriate modem communication link 194.

As defined herein, the term "communication link" includes any communication path that may enable the transport of electronic data between two entities such as computing systems or modules. The actual physical representation of a communication path between two entities is not important and may change over time. A logical communication link may include portions of a system bus, a local area network, a wide area network, the Internet, combinations thereof, or portions of any other path that may facilitate the transport of electronic data. Communication links may include hardwired links, wireless links, or a combination of hardwired links and wireless links. Communication links may also include software or hardware modules that condition or format portions of data so as to make them accessible to components that implement the principles of the present invention. Such components may include, for example, proxies, routers, firewalls, or gateways. Communication links may also include portions of a Virtual Private Network ("VPN").

While FIG. 1 and the corresponding discussion provide a general description of a suitable computing system in which the invention may be implemented, it will be appreciated that the features of the present invention, as disclosed herein, may be practiced in association with a variety of different system configurations.

Figure 2:
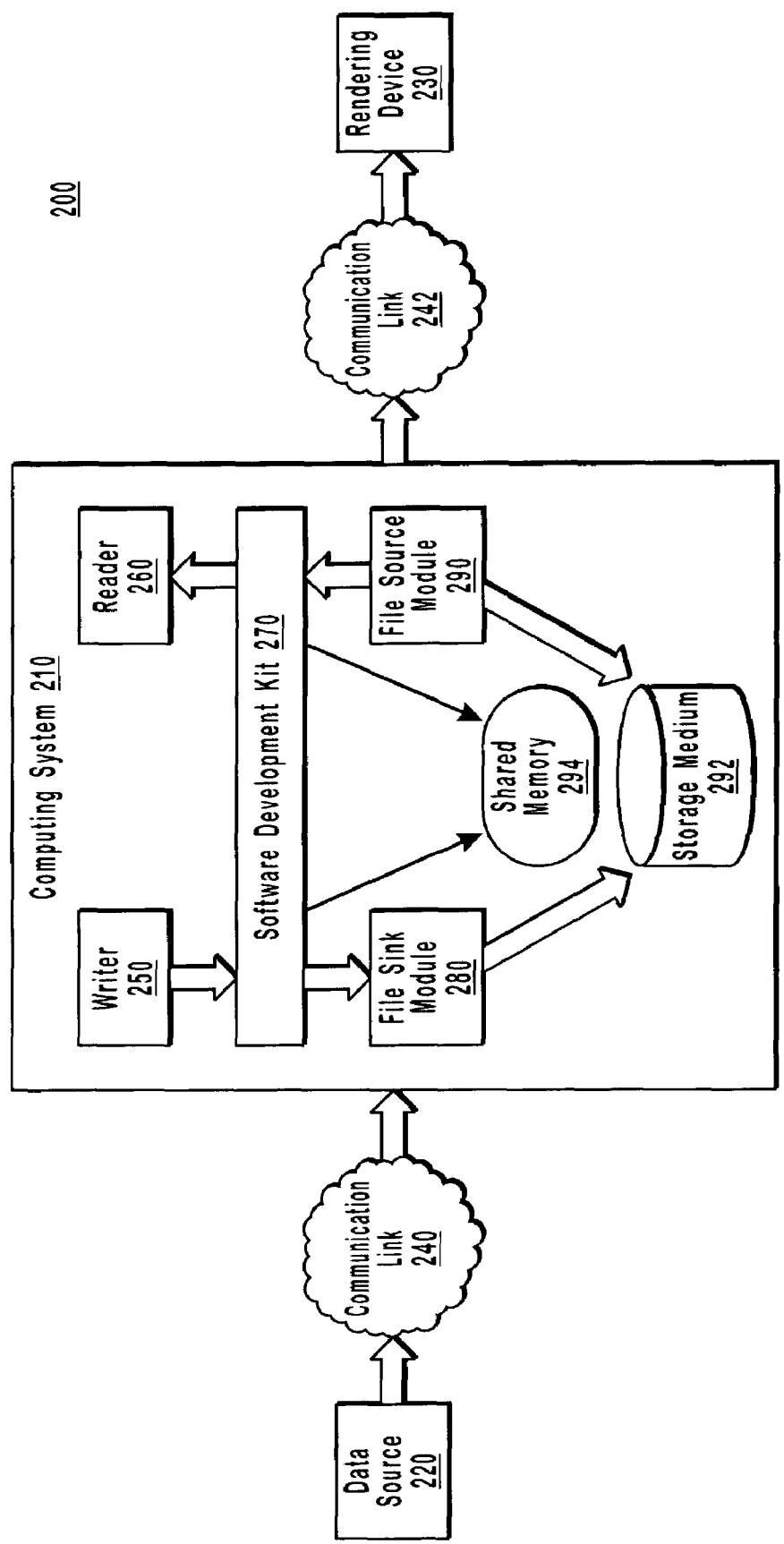
FIG. 2 illustrates a network environment in which a computing system is connected to a data source and a rendering device.

FIG. 2 illustrates one example of a network environment 200 in which the principles of the invention may be implemented. The illustrated network environment 200 includes a computing system 210 that is in communication with a data source 220 and a rendering device 230 through communication links 240. As shown, the computing system 210 includes a writer 250, a reader 260, a software development kit 270, a file sink module 280, a file source module 290, a storage medium 292, and shared memory 294. Each of the foregoing components of the network environment 200 and the computing system 210 will now be discussed.

In one embodiment, the computing system 210 comprises a PVR that is substantially the same as the computing system 100, which is described above in reference to FIG. 1. During use, the computing system 210 receives multimedia data from the data source 220 in a streaming format, such as MPEG. Examples of a data source include, but are not limited to, a broadcast station, the Internet, a mass storage device (e.g., a DVD), and the like.

The multimedia data provided to the computing system 210 may include, but is not limited to, streamed video and audio data. The communication link 240 between the data source 220 and the computing system 210 may include any suitable connection, including cable and optic connections, terrestrial antenna systems, satellite systems, and any other device or system capable of transmitting data to computing system 210.

Upon receiving the multimedia data, the computing system stores and processes the data so that it can be accessed at a subsequent time and rendered on an appropriate rendering device 230. Although only a single rendering device 230 is shown in the present embodiment, it will be appreciated by those of ordinary skill in the art, upon learning of the invention described herein, that the computing system 210 may also be networked with a plurality of different rendering devices. Each rendering device 230 may include a television, a monitor, an audio system, and other devices that are capable of rendering audio and/or video data. It will also be appreciated that the invention extends to embodiments in which data is not rendered on a rendering device 230. Accordingly, rendering device 230 is an optional component of the network 200.

Upon receiving the multimedia data from the data source 220, the computing system 210 writes the multimedia data to the storage medium 292 so that it can be accessed by one or more reader applications associated with the reader 260 and the rendering device 230.

The storage medium 292 may include temporary memory as well as permanent memory and may be stored locally within the computing system or remotely stored as desired. During use, at least a portion of the storage medium 292 is configured to store the multimedia data in a file format that includes a header, a data section, and an appended index.

The computing system 210 also includes a shared memory 294 that can be accessed from one or more reader applications. Shared memory 294 is presently shown to be physically separated from the storage medium 292. However, the shared memory may actually be physically located within the same mass storage that contains the storage medium 292. The shared memory 294 is shown to be separated from the storage medium 292, in the present embodiment, to illustrate how the contents of the shared memory are at least logically separated from the contents of the storage medium 292, as described below in more detail.

During use, the writer 250 writes data packets of the multimedia data to the storage medium 292 as the multimedia data is received from the data source 220. In the present embodiment, the writer 250 is associated with the file sink module 280, which directs the packets of the multimedia data to one or more appropriate files in the storage medium. The file sink module also creates a corresponding header and a corresponding index of the storage file(s) within the shared memory 294. The index stored in the shared memory 294 is a real-time index that is updated by the file sink module 280 as a corresponding file in the storage medium 292 is being written to. Similarly, the header stored in the shared memory 294 is a real-time header. Certain information in the real-time header, such as the number of data samples written to the data section of the file and the size of the file, is updated by the file sink module 280 as a corresponding file in the storage medium 292 is being written to.

In one embodiment, the writer 250 writes the multimedia data packets to the storage medium 292 through the Software Development Kit 270. The utility and function of software development kits are understood in the art to include appropriate programming for enabling the development of program applications and may include one or more Application Programming Interfaces (APIs) and programming tools. In the present embodiment, Software Development Kit 270 contains sufficient programming code and APIs for enabling the writer 250 to transform the multimedia data to the ASF format and write it to the storage medium 292 through the file sink module 280. The Software Development Kit 270 also enables the reader 260 to access stored multimedia data from the storage medium 292 through the file source module 290, as described below in more detail.

The file source module 290 interacts with one or more reader applications that are associated with the reader 260 or rendering device 230, which request data from the storage medium 292. The file source module 290 enables the reader 260 to access the data to honor appropriate data requests from the one or more reader applications.

One benefit of the present invention is that the file source module 290 enables the reader 260 to access the requested data even though the requested data may be contained in a live file that is being written to and that does not yet include an appended index. This is accomplished, according to one embodiment of the invention, when the file source module 290 redirects read requests for index information to the real-time index of the live file that is contained within the shared memory 294. The real-time index is accessed from the shared memory 294 to provide the requested information. Upon accessing the real-time index, for example, the reader 260 may be able to determine where the desired data is located within the live file of the storage medium 292. The desired data from the live file can then be accessed by the requesting reader applications. According to another embodiment of the invention, the file source module 290 redirects read requests for header information to the real-time header of the live file that is contained within the shared memory 294.

Examples of certain methods for implementing principles of the invention will now be provided in reference to FIGS. 3 through 6.

Figure 3:
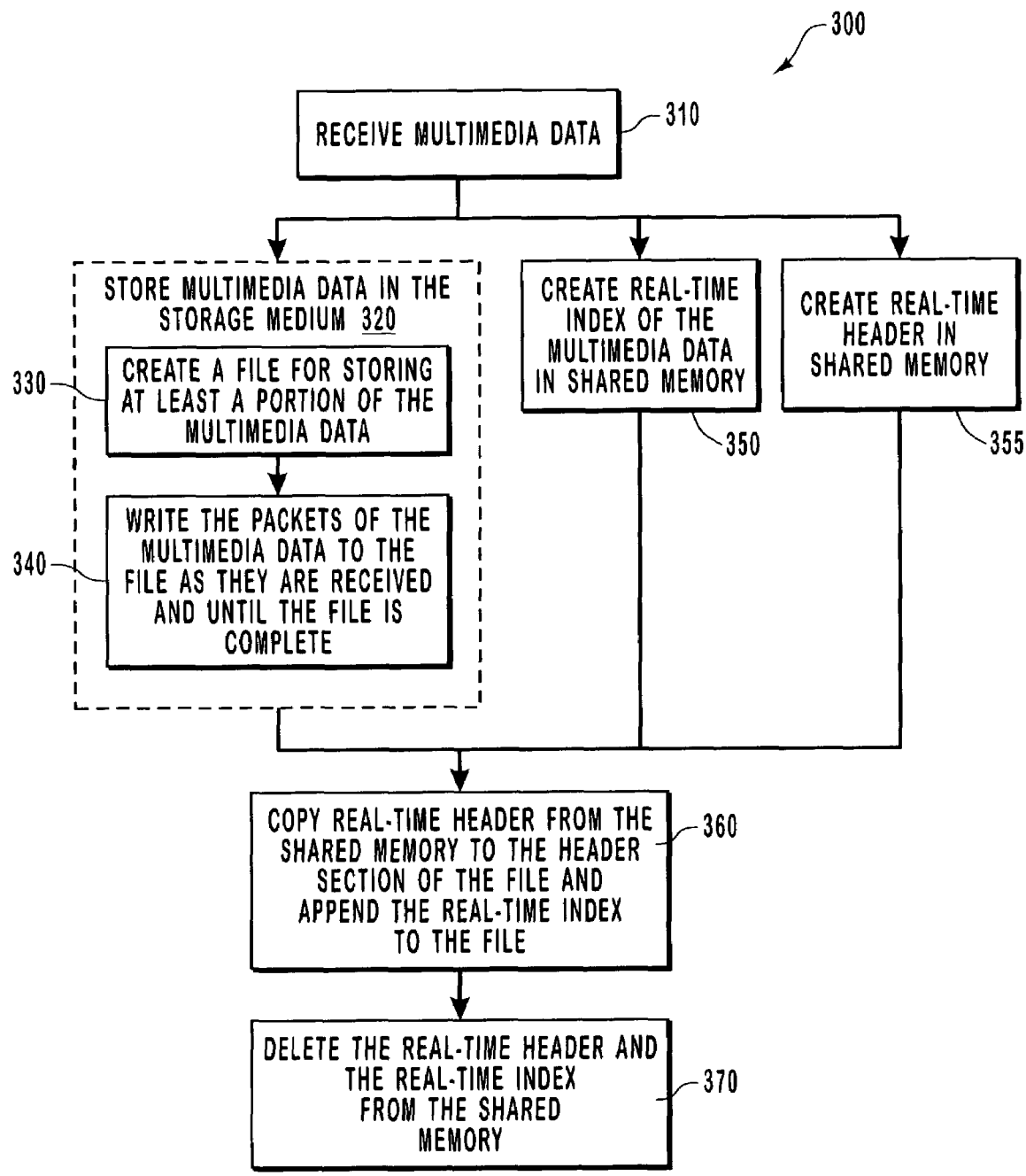
FIG. 3 is a flow diagram illustrating an example of one method for writing multimedia data to the storage medium of the computing system.

FIG. 3 illustrates a flow diagram of one method 300 for writing multimedia data to a file in the storage medium 292 of the computing system 210 and in a manner that enables the multimedia data to be accessed from the file while the file is being written to.

As shown, the flow diagram of FIG. 3 includes various acts (acts 310, 330, 340, 350, 355, 360, 370) for performing the present method 300. The first illustrated act includes the act for receiving multimedia data (act 310). This act may be performed over any period of time in which streamed multimedia data is received by the computing system 210 from a multimedia data source 220.

In one embodiment, the streamed multimedia data is encoded in an MPEG format and is processed and converted to a streaming format that is conducive to being stored in files that have appended indexes. One non-limiting example of a streaming format that is conducive to being stored in files that have appended indexes includes the ASF format. According to the present embodiment, the multimedia data includes a plurality of data packets that are received in a single stream from the multimedia data source, although the data packets may also be received in multiple streams from the data source.

Once the multimedia data is received (act 310), the method includes a functional, result-oriented step for storing the multimedia data in the storage medium of the computer system (step 320). Inasmuch as the receipt of multimedia data may occur over a period of time, step 320 may occur at the same time as act 310, and after the completion of act 310.

The step for storing multimedia data in the storage medium (step 320) includes any corresponding acts for accomplishing this result. However, in the illustrated example, the step 320 includes corresponding acts 330 and 340. In particular, step 320 may be performed by creating a file for storing at least a portion of the multimedia data (act 330) and by writing the packets of the multimedia data to the newly created file as the data packets are received (act 340). According to the present embodiment, act 340 is performed until the newly-created file is complete. The new file may become complete, for example, when it is filled, when the transmission of data from the multimedia data source has ceased, or when a predetermined duration of content has been written to the file. In one embodiment, the predetermined duration of content is within the range of between about 3 minutes and about 30 minutes.

FIG. 4 illustrates one example of a file 400 that is created according to act 330 for storing at least a portion of the multimedia data (act 330). As shown, the file 400 includes a reserved header section 410, a reserved data section 420, and a reserved index section 430.

By way of example, and not limitation, the reserved size for the file is about $2^{64}$ bytes, although the reserved size may differ to accommodate varying needs and preferences. In this present example, the reserved index section 430 is about $2^{32}$ bytes (4 Gigabytes) and the size of the data section is about $2^{64}$ bytes minus the size of the reserved index section (about $2^{32}$ bytes) minus the size of the header H1. The size of the header H1 may vary depending on the amount of information that is contained within the header H1. It will be appreciated that although a large amount of memory is reserved for the various sections of the file, the memory is not claimed from the storage medium for storing the file up front. Instead, memory from the storage medium is claimed incrementally to write data packets as they are received as described in act 340. By reserving such a large amount of memory for the file 400, particularly the reserved data section 420 of the file 400, the file 400 appears to be full and complete, even though it is not. This is useful, as described below, for causing the software development kit and reader applications to treat the multimedia data buffering files the same, whether they are complete or live.

In the present embodiment, file 400 is a 'live' file because it is currently being written to. As shown, data packets P1, P2 and P3 have been written to the reserved data section 420 of the file 400, and data packets P4 and P5 are in the process of being written to the reserved data section 420. According to the present embodiment, the act of writing the data packets to the file (act 340) may occur over any period of time and generally involves writing the data packets to the reserved data section 420 of the file 400.

In the present embodiment, file 400 includes a reserved header section 410 and a reserved index section 430 for appending header information and an index, respectively, after the file is complete. Prior to completing the file 400, header 450 and the index 440 of the file 400, which essentially consist of a real-time header and a real-time index respectively, are contained within the shared memory 494. The term "real-time" indicates that the header 450 and the index 440 in the shared memory 494 accurately reflect up-to-date changes that are made to the live file 400, which it corresponds with, despite that the index is not yet appended to the live file 400 and the header H1 in the reserved section of the live file 400 is not up to date with the header information contained in the up-to-date header 450 in the shared memory. In the present embodiment, header 450 and index 440 are created by the file sink 280 that is described above in reference to FIG. 2.

The granularity of the index 440 may vary to accommodate different needs and preferences. However, according to one embodiment, the granularity of the index 440 is about 0.5 seconds, such that if the file 400 contains five minutes of recorded content, the index 440 will include 600 entries that correspond with the five minutes of content.

The act of creating the real-time index of the multimedia data (act 350) and the act of creating the real-time header (act 355) may be accomplished at the same time the multimedia data is stored in the storage medium (step 320). After the file is complete, the real-time index will be appended to the end of the file, and the header section 410 in the file will be updated with the real-time header 450 maintained in the shared memory 494 (act 360). As illustrated in FIG. 3, the method of the present embodiment also includes the act of deleting the real-time header 450 and the real-time index 440 from the shared memory 494 (act 370) once the index has been appended to the file.

FIG. 5 illustrates a complete file 500 having an updated header H'1 510 and an appended index I'1 540. File 500 is the same as live file 400 of FIG. 4, except that it includes an update index H'1, an appended index I'1, and data packets P4, P5 and P6. In the present embodiment, appended index I'1 is the same as the real-time index I1 440 of FIG. 4 except that it has been updated to include indexing information regarding data packets P4, P5 and P6. Similarly, the header H'1 is the same as the real-time header 450 of FIG. 4 except that it has been updated to include indexing information regarding data packets P4, P5 and P6.

FIG. 5 further illustrates how the shared memory 594 has been cleared of any header and index associated with the completed file 500. By purging the shared memory 594 of the header and the index corresponding to file 500, the shared memory 594 now has space to store a new header and a new index for a new file. If at any time the shared memory 594 does not have enough space to store a real-time header or a real-time index corresponding to a live file, new temporary memory can be allocated to the shared memory from the storage medium of the computing system. The shared memory 594 may occasionally run out of memory, for example, when the real-time index grows very large because the file's duration exceeds the anticipated duration when it was created (e.g., it corresponds to a recording of a program and the PVR is informed of only the recording's start time, but not its duration).

As described above, one problem with existing devices is that they are unable to store ASF streamed data and other similarly formatted data in a way that enables the data to be accessed from a live file, prior to appending the index to the file. This is a problem, particularly for PVR devices, because it prevents seeking within the data contained within a live file until the file is complete and/or the index is appended to the file. The present invention overcomes this problem by providing methods for storing data in a manner that enables seeking in the data in a live file, even before the corresponding index to the data is appended to the file. An example of such a method has been described above in reference to FIG. 3. An example of accessing the stored data from a live file will now be provided in reference to FIG. 6.

Figure 6:
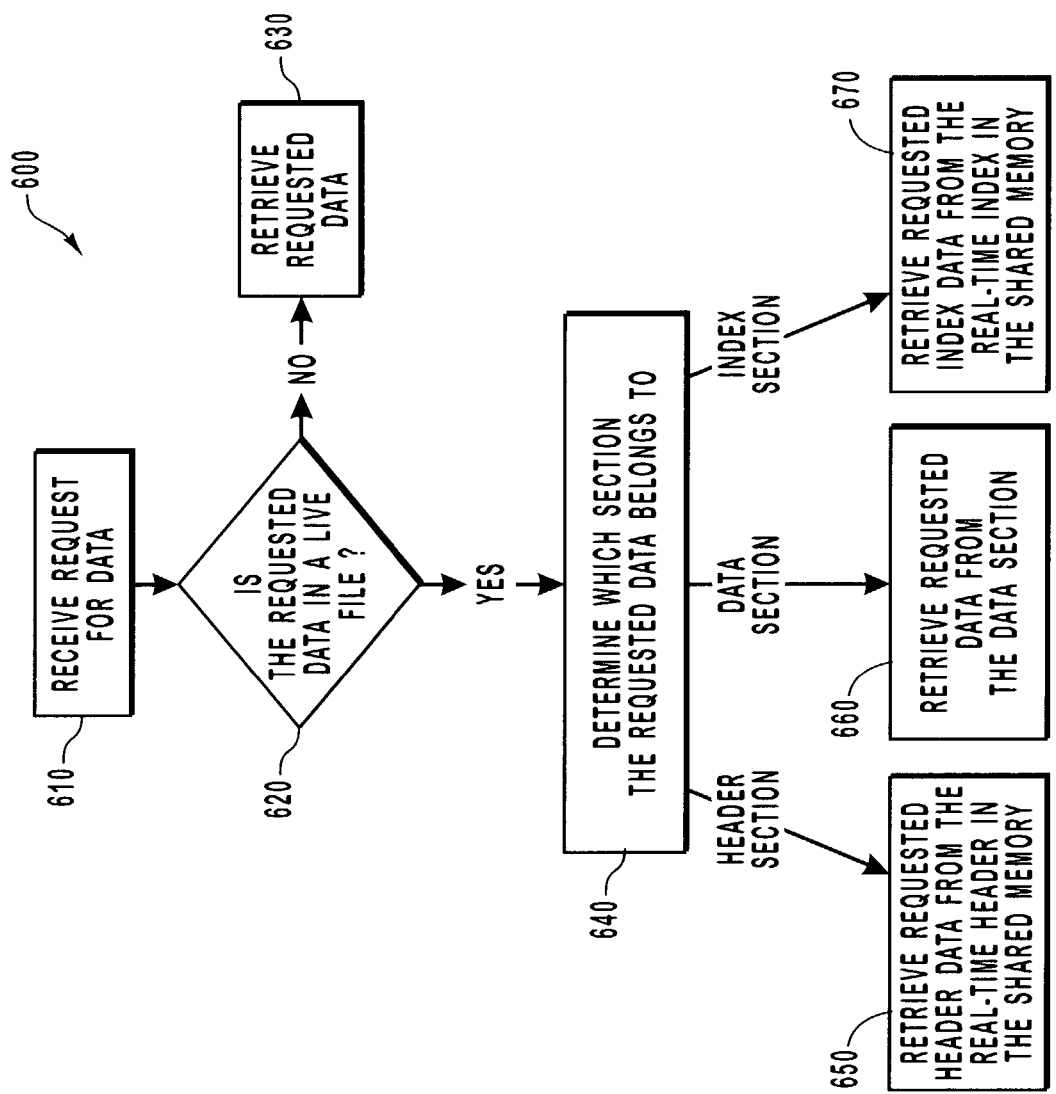

FIG. 6 illustrates a flow diagram 600 that includes various acts for accessing stored data from a live file. The first illustrated act includes the act of receiving a request for data (act 610). The request for data can originate from a reader application associated with the rendering device or a reader application associated with the reader of the computing system. Upon receiving the request for data (act 610), it is determined whether the data is contained in a live file (act 620).

According to the present embodiment, the reader application(s) requesting the data cannot tell if the data is contained in a live file. This determination is made by the file source module 290, which is described above in reference to FIG. 2. All of the files, including the live files appear to be complete files to reader applications and the software development kit 270 because the file source module 290 provides false header and index information to the reader applications for live files, making the live files appear complete. In particular, the file source module 290 directs any read requests for index information of a live file to the real-time index stored in the shared memory so that up-to-date index information regarding the index for the live file can be obtained. The file source module 290 also provides header information from real-time header stored in the shared memory 294 that suggests the file size includes the entire reserved memory for the file, even when the file is not completely filled with data and so as to provide current information for the number of data samples written so far to the data section of the live file. Header information that indicates the actual size of the file is correctly maintained within the reserved header section of the file.

The reader applications operating through the software development kit 270 are fooled into believing the live files are complete because the file source module presents the phony real-time header information and the real-time index of the live file(s). This causes the reader applications to treat all of the buffering files as complete files and to request data in the same manner from complete and live files.

When the requested data is actually contained in a complete file, then the requested data is retrieved (act 630). The requested data can be retrieved, as appropriate, from the header section, the data section or the index that is appended to the end of the file. However, when the requested data is contained in a live file, the file cannot be directly accessed by the reader application since the live file does not have an up to date header or an appended index. In this situation, the file source module 290, depending on which section the requested data corresponds to (act 640), obtains the data from the real-time header in the shared memory 294 (act 650), the data section (act 660) or the real-time index in the shared memory 294 (act 670)

If a request is made for data in the data section that has not yet been written to the file (act 660), the request is temporarily pended until the requested data is written to the file. Once the data is written to the file, the file sink module 280 then notifies the file source module 290 that the data is available so that it can be accessed.

It will be appreciated by those of skill in the art upon reading this application that the methods that are described herein may be used to enable the storage of ASF multimedia data within ASF files, such as within a PVR device, while allowing the ASF multimedia data to be accessed and seeked from live files that do not include appended indexes. However, the types of data that may be stored and accessed according to the invention are not limited to ASF data. Rather the invention extends to the storage and access of all types of data that are stored in file formats that include appended indexes.

Accordingly, the described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing system that receives multimedia data from a data source, the computing system including a storage medium configured for storing packets of the multimedia data within at least one file of the storage medium, and wherein the at least one file includes a header, a data section, and an index, a method for enabling the stored packets of the multimedia data to be accessed from the at least one file by at least one reader application at the same time multimedia data is being written to the at least one file, the method comprising:

an act of receiving multimedia data to be stored within the storage medium of the computing system;

an act of creating a first file in the storage medium, the first file being configured for storing the received multimedia data, the first file including a header section, a data section and an index section, wherein creating the first file includes reserving memory for each of the header section, data section and index section prior to writing the multimedia data to the first file;

an act of writing packets of the multimedia data file to the data section of the first file as the multimedia data packets are received;

an act of creating a real-time header of the first file that includes header information associated with the multimedia data being written to the first file and that is dynamically updated as the multimedia data is written but that is stored separately from the first file within a shared memory portion of the storage medium that is accessible by the at least one reader application at the same time the multimedia data is being written to the data section of the first file;

an act of creating a real-time index of the first file that includes index information associated with the multimedia data being written to the first file and that is dynamically updated as the multimedia data is written but that is stored separately from the first file within a shared memory portion of the storage medium that is accessible by the at least one reader application at the same time the multimedia data is being written to the data section of the first file; and after writing the packets of the multimedia data file to the data section of the first file, performing acts of:

updating the reserved header section of the first file with the real-time header information; and appending the real-time index to the reserved index section of the first file.

2. A method as recited in claim 1, wherein the header information includes up-to-date header information that is used to determine a reserved size of the first file and a number of data samples written to a data section of the first file, and wherein the real-time index includes up-to-date index information of the first file.

3. A method as recited in claim 1, wherein the multimedia data includes one of MPEG and ASF data.

4. A method as recited in claim 1, wherein the data stored to the first file includes ASF data.

5. A method as recited in claim 1, further including an act of receiving a request from at least one reader application for data contained in the first file, the request occurring prior to appending the first file with the real-time index.

6. A method as recited in claim 5, wherein the requested data includes multimedia data, and wherein the method further includes an act of directing the at least one reader application to a data section of the first file to enable the at least one reader application access the requested multimedia data.

7. A method as recited in claim 5, wherein the request for data includes a request for index information contained in the real-time index.

8. A method as recited in claim 7, wherein the method further includes an act of directing the at least one reader application to the real-time index to enable the at least one reader application access the requested index information.

9. A method as recited in claim 5, wherein the request includes a request for header information contained in the real-time header, the header information including one of a description of the size of the first file and the number of data samples written to the data section of the first file.

10. A method as recited in claim 9, wherein the method further includes an act of directing the at least one reader application to the real-time header to enable the at least one reader application access the requested header information.

11. A method as recited in claim 1, further including an act of deleting the real-time index from the shared memory portion of the storage medium.

12. A method as recited in claim 1, further including an act of deleting the real-time header from the shared memory portion of the storage medium.

13. A method as recited in claim 1, wherein the real-time index and the real-time header are created by a file sink module of the computing system.

14. A method as recited in claim 1, wherein the act of creating a file includes acts of designating a byte size portion of the file for the file header, designating a byte size portion of the file for the data section, and designating a byte size portion of the file for an index.

15. A method as recited in claim 14, wherein the byte size portion of the file designated for the appended index is about 4 gigabytes.

16. A method as recited in claim 15, wherein the byte size portion of the file designated for the data section is about $2^{64}$ bytes minus the byte size portion of the file designated for the appended index and the header.

17. A method as recited in claim 1, wherein the first file appears to be complete to the at least one reader application while the first file is only partially filled.

18. A method as recited in claim 1, wherein the real-time index contains information that identifies the location of the multimedia data packets contained in the first file.

19. A method as recited in claim 1, wherein the act of writing packets of multimedia data to includes writing the packets to a portion of the storage medium allocated for the first file.

20. A method as recited in claim 1, further including the following:

an act of creating a second file in the storage medium, the second file being configured for storing newly received multimedia data;

an act of writing the packets of the multimedia data to a data section of the second file as the multimedia data packets are received;

an act of creating a real-time header of the first file, the real-time header including header information and being disposed within a shared memory portion of the storage medium that can be accessed by the at least one reader application at the same time the multimedia data is being written to the data section of the second file; and an act of creating a real-time index of the second file, wherein the real-time index of the second file is disposed within a shared memory portion of the storage medium that can be accessed by the at least one reader application at the same time the multimedia data is being written to the data section of the second file.

21. In a computing system that receives multimedia data from a data source, the computing system including a storage medium configured for storing packets of the multimedia data within at least one file of the storage medium, and wherein the at least one file includes a header, a data section, and an index, a method for enabling the stored packets of the multimedia data to be accessed from the at least one file by at least one reader application at the same time multimedia data is being written to the at least one file, the method comprising:

an act of receiving multimedia data to be stored within the storage medium of the computing system;

a step for storing the packets of the multimedia data in a first file of the storage medium and in a file format that is associated with an appended index, wherein the packets of the multimedia data are stored in a data section of the first file, the first file also including a reserved header section and a reserved index section;

an act of creating a real-time header of the first file that includes header information associated with the multimedia data being written to the first file and that is dynamically updated as the multimedia data is written but that is stored separately from the first file within a shared memory portion of the storage medium that is accessible by the at least one reader application at the same time the multimedia data is being written to the data section of the first file;

an act of creating a real-time index of the first file that includes index information associated with the multimedia data being written to the first file and that is dynamically updated as the multimedia data is written but that is stored separately from the first file within a shared memory portion of the storage medium that is accessible by the at least one reader application at the same time the multimedia data is being written to the data section of the first file; and after storing the packets of the multimedia data, performing acts of:

updating the reserved header section of the first file with the real-time header information; and appending the real-time index to the reserved index section of the first file.

22. A method as recited in claim 1, wherein the header information includes up-to-date header information that is used to determine a reserved size of the first file and a number of data samples written to a data section of the first file, and wherein the real-time index includes up-to-date index information of the first file.

23. A method as recited in claim 21, wherein the multimedia data includes one of MPEG and ASE data.

24. A method as recited in claim 21, wherein the step for storing the packets of the multimedia data includes an act of creating a first file in the storage medium, the first file being configured for storing the received multimedia data.

25. A method as recited in claim 21, wherein the step for storing the packets of the multimedia data includes an act of writing the packets of the multimedia data to a data section of the first file as the multimedia data packets are received.

26. A method as recited in claim 21, further including an act of deleting the real-time index from the shared memory portion of the storage medium.

27. A method as recited in claim 21, further including an act of deleting the real-time header from the shared memory portion of the storage medium.

28. A method as recited in claim 21, wherein the act of creating a file includes an act of designating a byte size portion of the file for the file header, designating a byte size portion of the file for the data section, and designating a byte size portion of the file for an index.

29. A method as recited in claim 28, wherein the byte size portion of the file designated for the appended index is about 4 gigabytes.

30. A method as recited in claim 28, wherein the byte size portion of the file designated for the data section is about $2^{64}$ bytes minus the byte size portion of the file designated for the appended index and the header.

31. A method as recited in claim 21, wherein the first file appears to be complete to the at least one reader application.

32. A computer program product comprising one or more computer-readable storage media having stored thereon the following:

computer-executable instructions for implementing the method recited in claim 1.

33. A computer program product as recited in claim 32, wherein the one or more computer-readable media include system memory.

34. The computer program product as recited in claim 32, wherein the multimedia data includes one of MPEG and ASF multimedia data.

35. The computer program product as recited in claim 34, wherein the multimedia content includes at least one of audio data and video data.

36. The computer program product as recited in claim 32, wherein the data source includes one of the Internet, a broadcast station, a file, and a DVD.

37. In a computing system that receives multimedia data from a data source, the computing system including a storage medium configured for storing packets of the multimedia data within at least one file of the storage medium, and wherein the at least one file includes a header, a data section, and an index, a method for enabling the stored packets of the multimedia data to be accessed from the at least one file by at least one reader application at the same time multimedia data is being written to the at least one file, the method comprising:

an act of receiving multimedia data comprising a multimedia data file to be stored within the storage medium of the computing system, the multimedia data file comprising either (1) a file format that is associated with an appended index or alternatively (2) a file format that is not associated with an appended index, and wherein if the file format is not a multimedia format that is associated with an appended index, the method includes converting the multimedia data into a file format that is associated with an appended index;

an act of creating a first file in the storage medium that is configured for storing the received multimedia data, the first file including a header section, a data section and an index section, wherein creating the first file includes reserving memory for each of the header section, data section and index section prior to writing the multimedia data to the first file;

an act of writing the packets of the multimedia data to a data section of the first file as the multimedia data packets are received and in the file format associated with an appended index;

an act of creating a real-time header of the first file that includes header information associated with the multimedia data being written to the first file and that is dynamically updated as the multimedia data is written but that is stored separately from the first file within a shared memory portion of the storage medium that is accessible by the at least one reader application at the same time the multimedia data is being written to the data section of the first file;

an act of creating a real-time index of the first file that includes index information associated with the multimedia data being written to the first file and that is dynamically updated as the multimedia data is written but that is stored separately from the first file within a shared memory portion of the storage medium that is accessible by the at least one reader application at the same time the multimedia data is being written to the data section of the first file;

an act of receiving a request from at least one reader application for multimedia data contained in the first file, the request for multimedia data occurring prior to appending the first file with a completed index of the multimedia data written to the first file; and an act of directing the at least one reader application to the real-time, index which is stored separately from the first file to enable the at least one reader application access the requested multimedia data.

38. A method as recited in claim 37, wherein the multimedia data includes audio and video data that is stored in an ASF format.

39. A method as recited in claim 37, further including an act of appending the real-time index to the end of the first file upon completing an act of writing the packets of the multimedia data to the data section of the file.

40. A method as recited in claim 39, further including an act of deleting the real-time index from the shared memory portion of the storage medium upon appending the real-time index to the end of the first file.

41. A method as recited in claim 37, wherein the request for multimedia data includes a request for information that is contained within the real-time index.

42. A method as recited in claim 37, wherein the at least one file includes more than one file.

43. A method as recited in claim 37, wherein the at least one reader application includes more than one reader application.

* * * * *